United States Patent [19]

Miyake

[11] Patent Number: 5,760,921
[45] Date of Patent: Jun. 2, 1998

[54] METHOD OF AND APPARATUS FOR IMAGE PROCESSING

[75] Inventor: Nobutaka Miyake, Yokohama, Japan

[73] Assignee: Canon Kabushiki Kaisha, Tokyo, Japan

[21] Appl. No.: 322,164

[22] Filed: Oct. 13, 1994

[30] Foreign Application Priority Data

Oct. 28, 1993 [JP] Japan .................................. 5-270585

[51] Int. Cl.$^6$ ............................................. H04N 1/46
[52] U.S. Cl. ................................................... 358/458
[58] Field of Search ............................ 345/132, 130, 345/134; 358/458

[56] References Cited

U.S. PATENT DOCUMENTS 4,751,585  6/1988  Shibazaki ................. 358/464
5,469,274  11/1995  Iwasaki et al. ............ 358/464

OTHER PUBLICATIONS

US Application Serial Number 08/311,560 filed Sep. 23, 1994, to Miyake.

*Primary Examiner*—Mark R. Powell
*Attorney, Agent, or Firm*—Fitzpatrick, Celia, Harper & Scinto

[57] ABSTRACT

A method and an apparatus for converting low-resolution information into high-resolution information. When image information having multiple gradations is input and an image area corresponding to one pixel is increased to an image area for N×M pixels (where N and M are each an integer equal to or larger than 2) to convert a low-resolution input image into a high-resolution image to be output, the number of gradations used for peripheral pixels around a target pixel is detected and the number of gradations in N×M pixels corresponding to the target pixel is determined according to the number of gradations detected for the peripheral pixels. By using this method, it is possible to obtain a high-quality image without causing interpolation blurs and jags at the time of conversion from low-resolution information to high-resolution information.

16 Claims, 10 Drawing Sheets

TARGET PIXEL E

WINDOW

FIG. 2(b)

TARGET PIXEL M

FIG. 3(a)

| 187 | 187 | 187 |
|-----|-----|-----|
| 187 | 187 | 187 |
| 187 | 187 | 187 |

FIG. 3(b)

| 224 | 48 | 48 |
|-----|----|----|
| 224 | 224 | 48 |
| 224 | 224 | 224 |

FIG. 3(c)

| 16 | 15 | 12 |
|----|----|----|
| 14 | 12 | 12 |
| 11 | 12 | 10 |

FIG. 4

| 1 | 1 | 1 |
|---|---|---|
| 1 | 1 | 1 |
| 1 | 1 | 1 |

INTERPOLATION POINT $E=(1-i)(1-j)A+i\cdot(1-j)B+j\cdot(1-i)C+ijD$

INPUT INFORMATION

INFORMATION AFTER RESOLUTION CONVERSION BY CLOSEST PROXIMITY INTERPOLATION
<TWO TIMES × TWO TIMES>

INFORMATION AFTER RESOLUTION CONVERSION FIRST-ORDER INTERPOLATION
<TWO TIMES × TWO TIMES>

METHOD OF AND APPARATUS FOR IMAGE PROCESSING

BACKGROUND OF THE INVENTION

1. Field of the Invention

The present invention relates to a method of and an apparatus for image processing in a manner of converting input low-resolution information into high-resolution information.

2. Description of the Related Art

Methods of converting low-resolution information into high-resolution information have been practiced for image processing between input and output devices differing in resolution and for communication between apparatuses differing in resolution.

Figure 10:
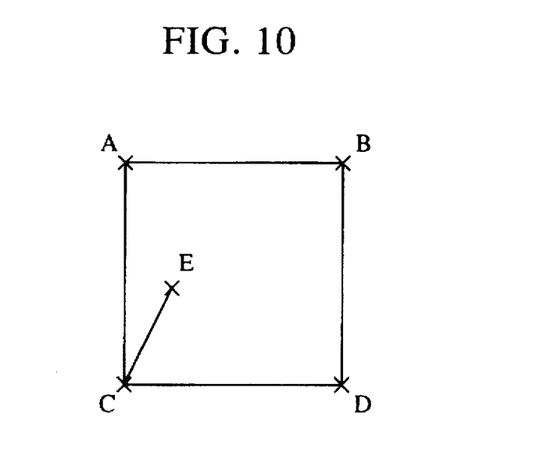
FIG. 10 is a diagram of a closest proximity interpolation method in the conventional art.
Figure 11:
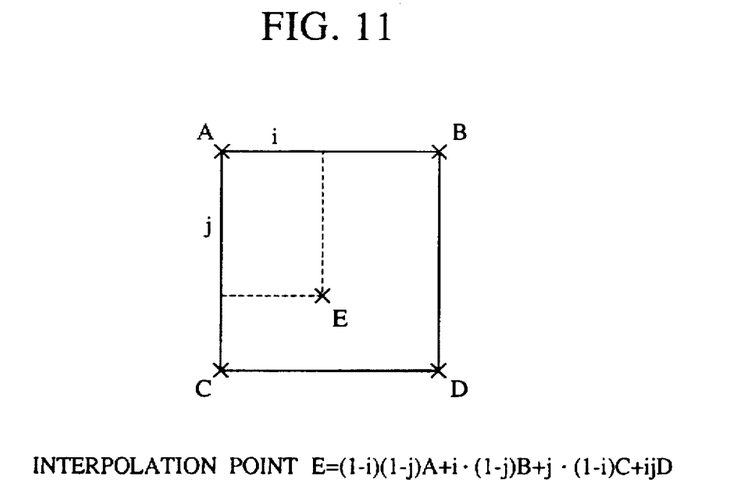
FIG. 11 is a diagram of a first-order interpolation method in the conventional art.

Various methods have been proposed for converting input low-resolution information into high-resolution information. The conventional methods proposed vary in the manner of conversion processing according to the kinds of image to be processed (for example, a multivalued image having gradation information for each pixel, a two-valued image with pseudo-halftones, a two-valued image formed by using a fixed threshold value, and a character image). The invention is intended to process multivalued images such as natural images having gradation information for each pixel. Typical interpolation methods known as methods for converting multivalued images are a closest proximity interpolation method, in which, as shown in FIG. 10, the value of a pixel closest to an interpolation point is placed at the interpolation point (in the case shown in FIG. 10, the pixel value of an interpolation point E is set to the same value as that of a pixel value C), and a first-order interpolation method in which, as shown in FIG. 11, a pixel value E, i.e., the pixel value of an interpolation point surrounded by four points having pixel values A, B, C, and D, is determined from the distances to the four points by the following calculation:

$$E=(1-i)(1-j)A+i\cdot(1-j)B+j\cdot(1-i)+ijD$$

(where i is distance from the point A in the horizontal direction and j is the distance from the point A in the vertical direction ($i \leq 1$, $j \leq 1$), assuming that the distances between the pixels A and B, and A and C, are 1).

These conventional methods, however, entail drawbacks described below.

The method shown in FIG. 10 has the advantage of its simple arrangement but is disadvantageous in that if a natural image or the like is processed, enlarged blocks of pixels are visually noticeable as a deterioration in image quality, since one pixel value is determined for each enlarged block.

Figure 12A:
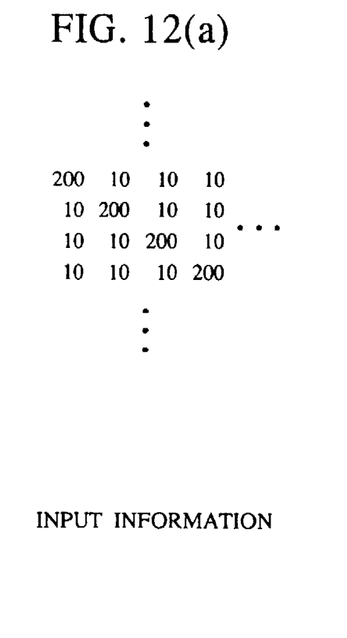
FIGS. 12(a) through 12(c) are diagrams showing examples of processing in accordance with the conventional methods.
Figure 12B:
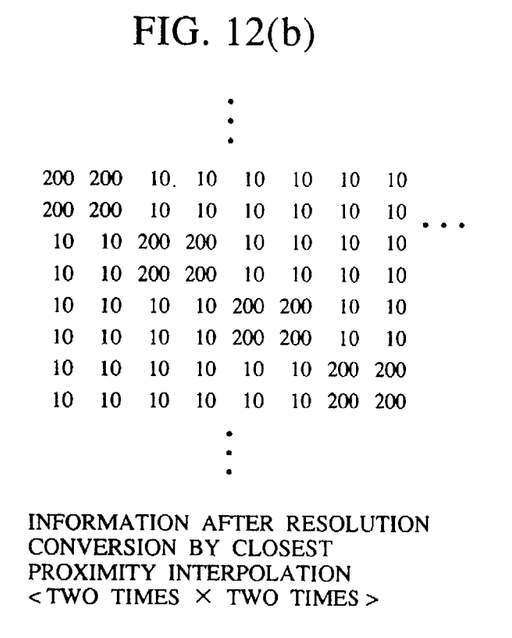

Also, in the case of using this method for characters, line drawings, computer graphics or the like, an undesirable image results in which jags show, particularly in a slanted line, as shown in FIGS. 12(a) and 12(b). FIGS. 12(a) and 12(b) show an example of resolution conversion of magnification by two in each of vertical and horizontal directions. The image quality is reduced if the magnification is increased ("200" and "10" in FIG. 12(a) and 12(b) representing pixel values).

The method shown in FIG. 11 is generally used for enlargement of natural images. Images obtained by this method have averaged and smoothed image qualities but are blurred in edge portions or portions where high sharpness is required. Moreover, in the case of an image obtained by scanning a map or the like, or a natural image containing character portions, it is possible that important information in the original image cannot be perceived by a person who sees the image.

Figure 12C:
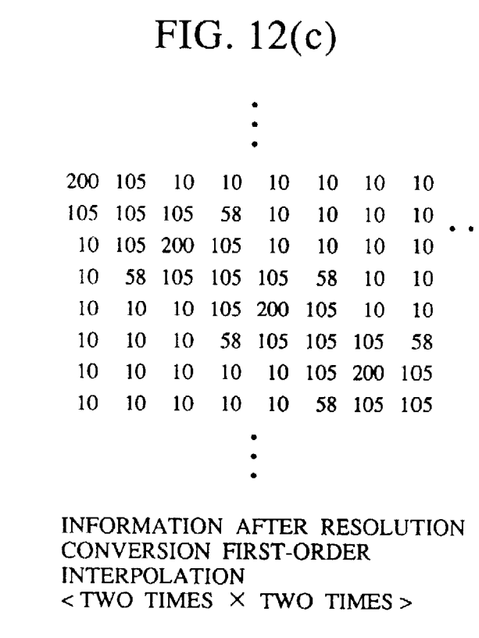

FIG. 12(c) shows image information obtained by interpolating input image information shown in FIG. 12(a) at a magnification of ×2 in each of vertical and horizontal directions based on the method shown in FIG. 11.

As is apparent from FIG. 12(c), pixel values are not uniform at boundaries between the slanted line and the background, or within the slanted line, so that the image is blurred.

Applications of resolution conversion (pixel density conversion) to internal functions of image output apparatuses such as printers will also be discussed. In printers, various situations are possible, where image information transmitted from a host computer is natural image information input through an image input device such as an image scanner, or character or line drawing information artificially formed by an application software program on a host computer, computer graphic information, or the like. A printer may conveniently use a discrimination signal transmitted to it together with image information which signal is provided as attribute information showing characteristics of an image, the resolution of which is to be converted in the printer. However, system configurations designed for transmission using no such discrimination signal are now being increased.

Conventionally, in such a situation, resolution conversion for entire image information is ordinarily practiced by using the method shown in FIG. 11. That is, natural images are treated with priority while images artificially formed, such as characters and line drawings, are somewhat sacrificed (FIG. 12(c)). However, it is seriously disadvantageous for printers to have a characteristic of forming characters and line drawings that are difficult to see. With respect to high-resolution printers or the like capable of outputting a value of multiple gradations for every pixel, resolution conversion suitable for the output resolution of their engines has not been realized.

SUMMARY OF THE INVENTION

In view of the above-described problems, an object of the present invention to provide an image processing method and an apparatus which make it possible to perform resolution conversion suitable for any image, whether characters, natural images and the like, to obtain a high-quality image.

Another object of the present invention is to provide an image processing method and an apparatus which make it possible to form an image consisting of a line drawing and a natural image into image information of a higher resolution in such a manner that sharp edges of line drawing portions can be reproduced without being jagged, as well as to form a high-quality image from a natural image while reducing occurrence of interpolation blur.

Still another object of the present invention is to provide an image processing method and an apparatus which make it possible to easily convert low-resolution information into high-resolution information, and which are applicable to a system for communication between apparatuses differing in resolution and to printers and copying machines for outputting high-quality images by variously changing the magnification.

According to one aspect of the present invention, there is provided an information processing apparatus in which image information having multiple gradations is input, and an image area corresponding to one pixel is increased to an image area for N×M pixels (where N and M are each an integer equal to or larger than 2) to convert a low-resolution input image into a high-resolution image, the image processing apparatus comprising detection means for detecting the number of gradations used for peripheral pixels around a target pixel (the pixel currently being processed), and determination means for determining the number of gradations in N×M pixels corresponding to the target pixel according to the number of gradations detected by the detection means.

According to another aspect of the present invention, there is provided an information processing apparatus in which image information having multiple gradations is input, and an image area corresponding to one pixel is increased to an image area for N×M pixels (where N and M are each an integer equal to or larger than 2) to convert a low-resolution input image into a high-resolution image, the image processing apparatus comprising detection means for detecting the number of gradations used for peripheral pixels around a target pixel, calculation means for detecting a maximum value and a minimum value of the peripheral pixels around the target pixel and for calculating a contrast between the maximum and minimum values, and determination means for determining the number of gradations in N×M pixels corresponding to the target pixel on the basis of the number of gradations detected by the detection means and the contrast calculated by the calculation means.

According to still another aspect of the present invention, there is provided an information processing apparatus in which image information having multiple gradations is input, and an image area corresponding to one pixel is increased to an image area for N×M pixels (where N and M are each an integer equal to or larger than 2) to convert a low-resolution input image into a high-resolution image, the image information processing apparatus comprising smoothing means for smoothing input low-resolution image information, interpolation means for interpolating the information smoothed by the smoothing means, detection means for detecting first and second values from peripheral pixels around a target pixel, and disposition means for disposing the first and second values in N×M pixels on the basis of interpolation information from the interpolation means.

In the apparatuses thus arranged, even if characters, a line drawing and the like artificially formed and a natural image are mixed in one image, jag-free high-edge-sharpness conversion is made with respect to artificial image portions while another kind of conversion is made with respect to natural image portions to form a good image free from interpolation blurs.

These and other objects, features and advantages of the present invention will become apparent from the following detailed description of the preferred embodiments of the invention taken in conjunction with the accompanying drawings.

DESCRIPTION OF THE PREFERRED EMBODIMENTS (First Embodiment)

Figure 1:
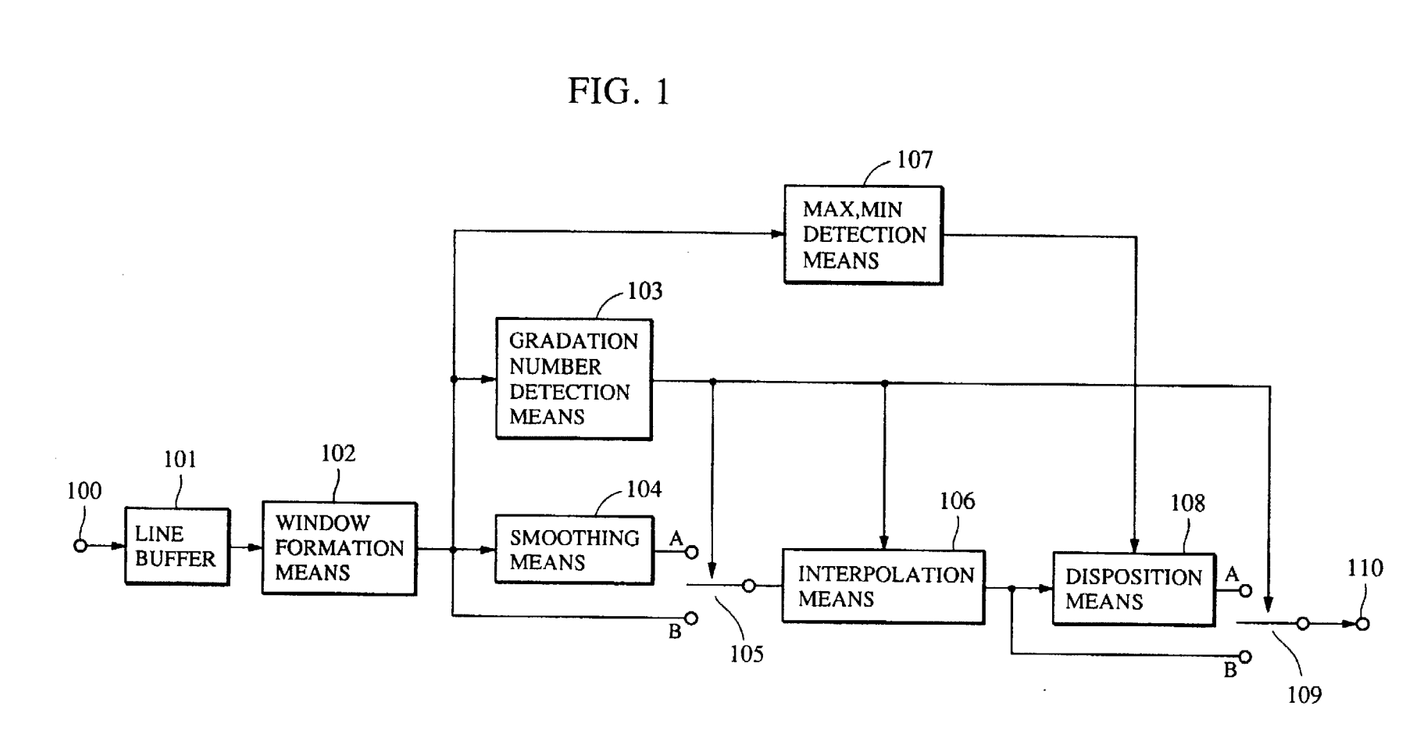
FIG. 1 is a block diagram showing essential components of a first embodiment of the present invention.

FIG. 1 shows blocks representing essential components of an image processor in accordance with the first embodiment of the present invention. It is generally efficient to provide the image processing apparatus of the present invention in an image output unit such as a printer. However, the image processing apparatus of the present invention may be designed for use in various processing units other than such output units, and may also be incorporated as an application software in a host computer.

The operation of this embodiment will be described with reference to the block diagram of FIG. 1. An example of conversion in which input image information is converted into information of N pixels in the vertical and M pixels in the horizontal directions corresponding to each pixel of the input information (N and M are each an integer equal to or larger than 2).

Figure 2A:
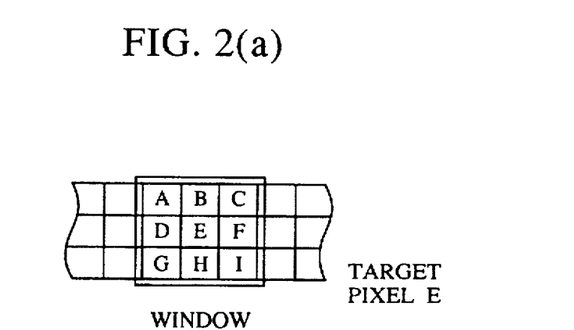
FIGS. 2(a) and 2(b) are diagrams of an example of a window and windows specially used in the embodiment of FIG. 1.

Through an input terminal 100, low-resolution image information is input. It is assumed here that image information is multi-gradation information in which the number of gradations for each pixel is greater than one (preferably at least three). Input information is stored in a line buffer 101 having a capacity of several lines. A window formation means 102 serves to select data on a group of pixels around a target pixel from the information stored in the line buffer 101 and to store the selected data in a register or the like. FIG. 2(a) shows an example of a window, which is a 3×3 window, and in which the pixel E at the center is the target pixel. The window is scanned to examine each pixel in connection with processing of the target pixel. In this embodiment, a 3×3 window and a 5×5 window containing this 3×3 window (FIG. 2(b)) are prepared for smoothing processing, described below.

Figure 3A:
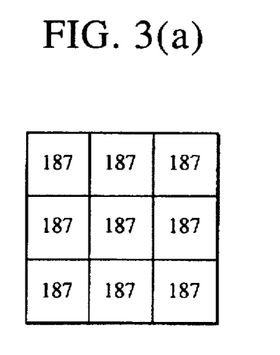
FIGS. 3(a), 3(b), and 3(c) are diagrams of the number of gradations in windows.
Figure 3B:
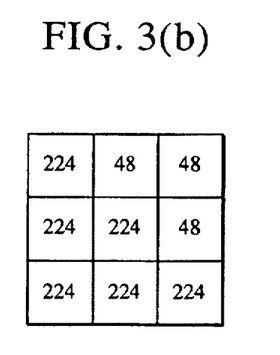
Figure 3C:
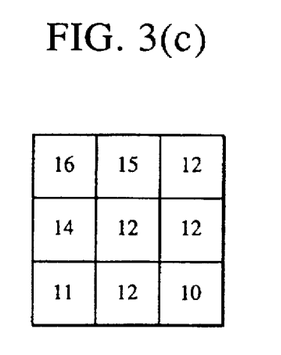

A gradation number detection means 103 serves to detect the number (kind) of gradations in each window. Referring to FIGS. 3(a) through 3(c), the number of gradations is 1 in the 3×3 window shown as an example in FIG. 3(a), 2 in the window shown in FIG. 3(b), and 6 in the window shown in FIG. 3(c). That is, the gradation number detection means 103 detects the number of different values in the window. This embodiment is characterized by the numbers of gradations in the windows having a large influence on the determination of the number of gradations of the (N×M) pixels constituting a block which after resolution conversion processing will correspond to the target pixel (hereinafter referred to as "target pixel block").

Figure 2B:
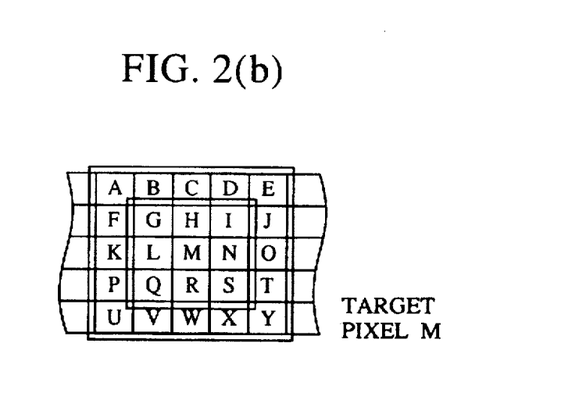
Figure 4:
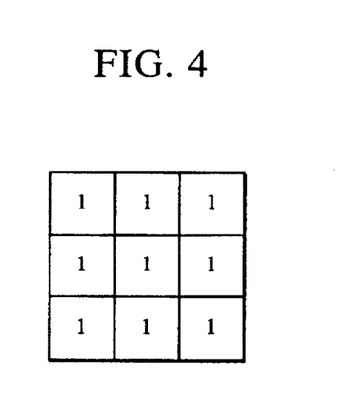
FIG. 4 is a diagram of an example of a smoothing filter.
Figure 5:
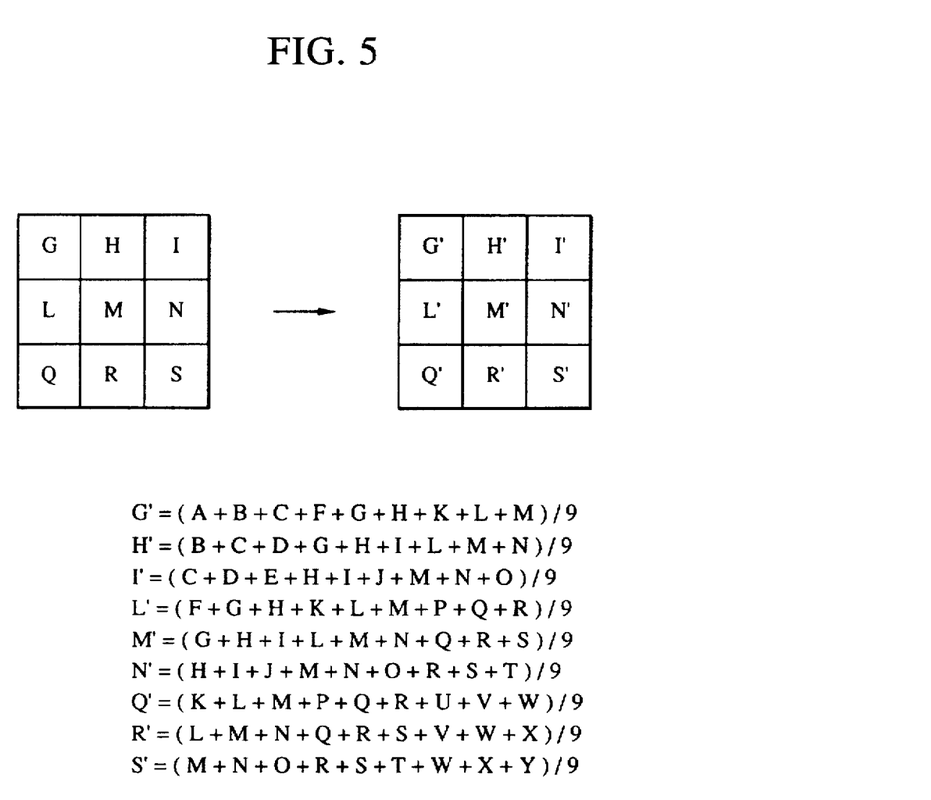
FIG. 5 is a diagram of smoothing in one window of the first embodiment.

A smoothing means 104 serves to smooth the pixels in each window including the target pixel. If the window shown in FIG. 2(b) is processed by using the smoothing filter shown in FIG. 4, then the values in the 3×3 window are converted as shown in FIG. 5.

A switch 105 is changed over according to a determination made by the gradation number detection means as to whether or not the number of gradations is equal to or smaller than 2. If the number of gradations is 2 or less, a connection to terminal A is established in the switch 105.

In other cases, a connection to terminal B is established.

An interpolation means 106 serves to interpolate (N×M) pixels at one target pixel by first-order interpolation processing, such as that described above with reference to FIG. 11 (hereinafter referred to as "linear interpolation processing"). The interpolation means of the present invention may be any other well-known interpolation means.

However, interpolation means incapable of maintaining a suitable continuity between a target pixel and peripheral pixels is undesirable.

A maximum and minimum detection means 107 serves to detect the maximum value and the minimum value in one 3×3 window. If the number of gradations in one window is only one, the maximum value and the minimum value are equal to each other.

Figure 6:
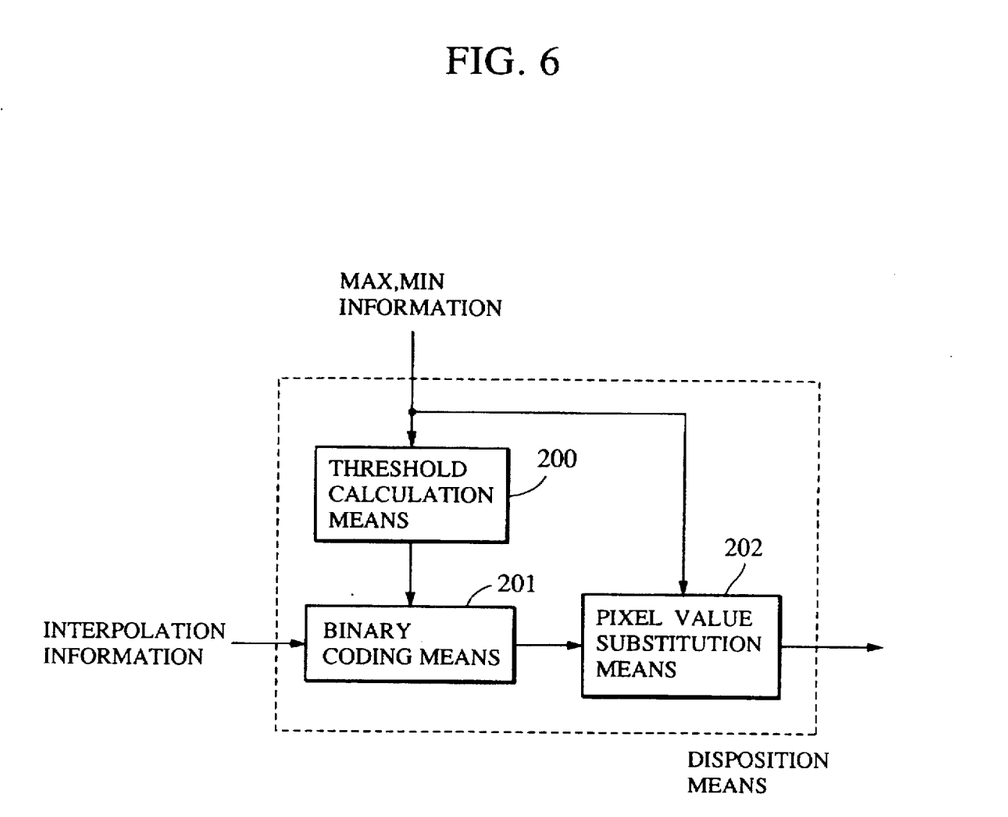
FIG. 6 is a diagram showing details of the configuration of the disposition means shown in FIG. 1.

A disposition means 8 shown in FIG. 1 has a construction such as that shown in FIG. 6, for example.

The area within the broken line block shown in FIG. 6 represents the disposition means 108. The disposition means 108 includes a threshold calculation means 200 for calculating a binary coding threshold value from input maximum and minimum values. For example, if the threshold value is TH and the maximum and minimum values are MAX and MIN, respectively, then $$TH=(MAX+MIN)/2$$

is calculated. A binary coding means 201 encodes information for interpolation in one target pixel block by using the calculated threshold value. A pixel value substitution means 202 substitutes the maximum value for pixel values equal to or larger than TH after binary coding, and the minimum value for pixel values smaller than TH. In the target pixel block after substitution, the maximum and the minimum values in the window are disposed.

A switch 109 shown in FIG. 1 serves to select either a block produced by the disposition means or a block directly output from the interpolation means 106. The switch 109 is operated according to the number of gradations detected by the gradation number detection means. In the switch 109, as in the case of the switch 105, a connection to terminal A is established if the number of gradations is 2 or less, and a connection to terminal B is established in other cases.

Through an output terminal 110, information on (N×M) pixels in each target pixel block is output.

In this embodiment, if the number of gradations in one window is 2, the number of gradations in the resulting target pixel block is either 2 or 1. Also, if the number of gradations in one window is 1, the number of gradations in the resulting target pixel block is also 1, since the maximum value and the minimum value are equal to each other. If the number of gradations in one block is three or more, the number of gradations in the resulting target pixel block is indefinite because the block is output directly from the interpolation means.

Since data output through the terminal 110 is multivalued data, it is directly used for recording in a printer if the printer is capable of multivalued recording. If the output data is used in a two-valued (binary) recording printer, it is used after being processed by binary coding processing.

The content of processing of this embodiment will now be described.

It is assumed here that the processing of this embodiment is performed as processing in an image output unit such as a printer. In printers, various situations are possible, where image information transmitted from a host computer is natural image information input through an image input device such as an image scanner, character or line drawing information artificially formed by an application software program on a host computer, computer graphic information, or the like. A printer may conveniently use a discrimination signal transmitted to it together with image information which signal is provided as attribute information showing characteristics of an image, the resolution of which is to be converted in the printer.

However, system configurations designed for transmission using no such discrimination signal are now becoming more common.

In this embodiment, therefore, if the number of gradations in one window is 2, it is determined that there is a high probability that the processed image is a certain kind of image, such as a character image or a line drawing image, formed by a page description language (PDL) on a host computer or by any kind of application software program, and conversion processing for preventing occurrence of jags is performed at the time of resolution conversion.

An example of processing of this embodiment will be described with respect to particular pixel data values as an example.

Figure 7A:
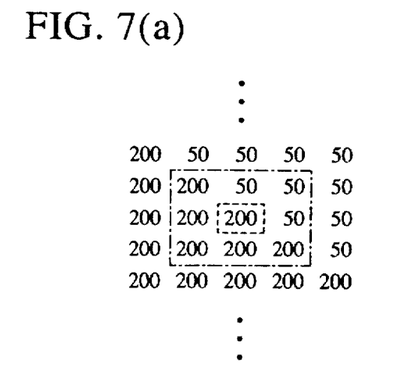
FIGS. 7(a) through 7(e) are diagrams of processing of the first embodiment, showing examples of values actually used.
Figure 7B:
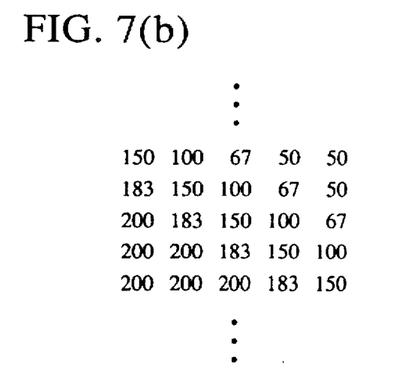

FIG. 7(a) shows a portion of an input image. It is assumed here that the pixel surround by the broken line is the target pixel, and that the area surrounded by the dot-dash line is the window. The image shown in FIG. 7(a) is processed by smoothing because the number of gradations in the window is 2. FIG. 7(b) shows pixel values after smoothing in the same portion as that in FIG. 7(a). The target pixel "200" surrounded by the broken line is converted into "150" by smoothing.

Figure 7C:
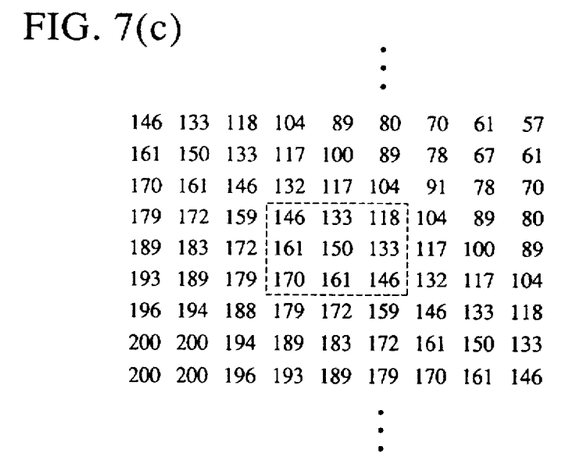
Figure 7D:
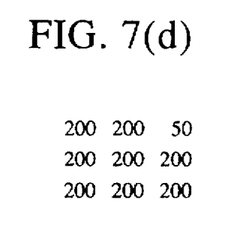
Figure 7E:
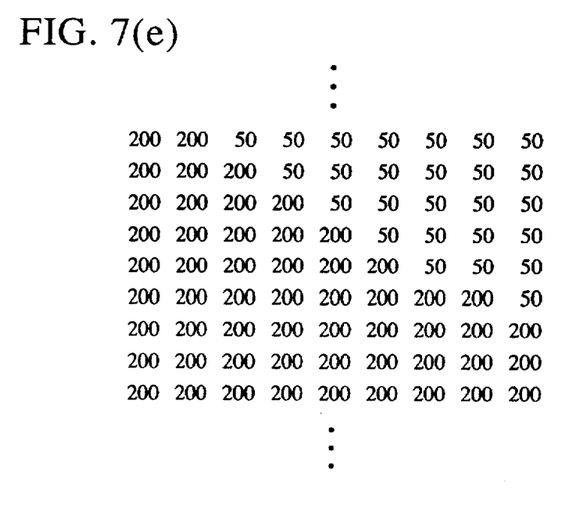

FIG. 7(c) shows pixel values around the target pixel after linear interpolation. Assuming N=M=3, the area for one pixel is increased to the area for nine pixels. Nine pixels surrounded by the broken line form a target pixel block. Since the number of gradations in the window shown in FIG. 7(a) is 2, rearrangement is performed by the disposition means 108. First, the target pixel block is converted into two-valued data. Since MAX=200 and MIN=50 from the window of FIG. 7(a), the target pixel block is converted by using a binary coding threshold value TH=125. FIG. 7(d) shows the result of this conversion. FIG. 7(e) shows a final result after processing by shifting the target pixel.

As is apparent from this example, suitable resolution conversion can be achieved at any magnification without causing jags. Since the number of gradations in the target pixel block is limited to 2 as in the window, there is no possibility of occurrence of blur with the increase in resolution.

Dependence of input image information on resolution will now be discussed. In a character, a line drawing or the like formed on a host computer or the like, the exact form of an edge formed in a low-resolution state depends upon the original resolution. Resolution conversion of this image entails obstructive frequency components. It is therefore necessary to form an edge (high-frequency-component information) suitable for a new resolution by performing resolution conversion after removing obstructive frequency components (collapsing the edge).

In contrast, a natural image is substantially free from dependence upon resolution even in a low-resolution state because it is formed by being filtered through a low-pass filter. That is, because such an image is in an edge-collapsed state when formed, the amount of obstructive frequency components is small. In this embodiment, therefore, if the number of gradations in one window is three or more, it is determined that there is a probability of the target pixel belonging to a natural image portion, and the smoothing means and the disposition means for setting the number of gradations to 2 are not used.

(Second Embodiment)

Figure 8:
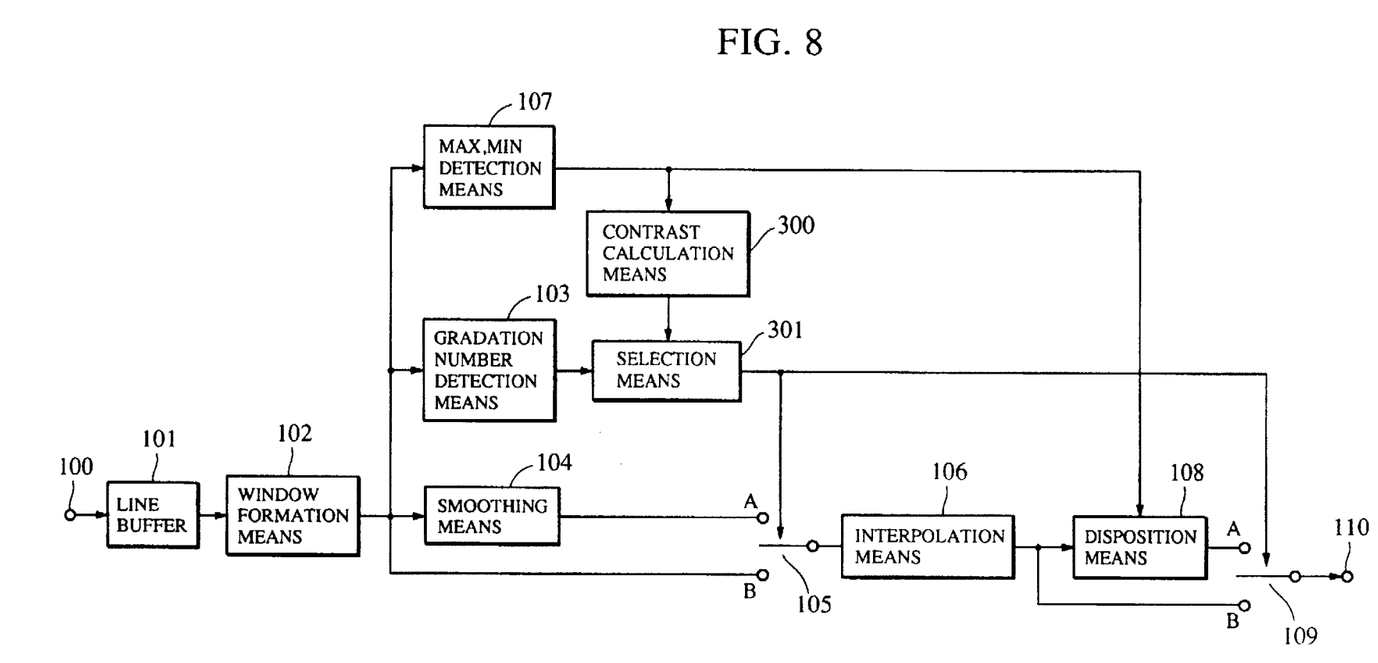
FIG. 8 is a block diagram showing essential components of a second embodiment of the present invention.

FIG. 8 shows blocks representing essential components of the second embodiment of the present invention.

The components of this embodiment identical to those shown in FIG. 1 are indicated by the same reference characters in FIG. 8, and their details will not be described. This embodiment is characterized by the contrast between peripheral pixels being evaluated as well as the detected number of gradations of the peripheral pixels to determine the number of gradations in a target pixel block.

A contrast calculation means 300 calculates the difference between the maximum and minimum values detected by maximum and minimum detection means 107, i.e., a contrast. The calculated contrast is transmitted to a selection means 301. The selection means 301 is also supplied with information on the number of gradations of peripheral pixels detected by gradation number detection means 103 in the same manner as in the first embodiment. The selection means 301 has an internal comparator to compare an input contrast value with a preset threshold value and to make a determination as to whether or not the contrast value is larger than the threshold value. The threshold value may be experimentally determined to be set. If the number of gradations of peripheral pixels is 2 and if the contrast value is larger than the threshold value, the selection means 301 determines that the examined pixels belong to an image artificially formed, i.e., a character, a line drawing, an image developed by a page description language, or the like.

It is assumed that a natural image, for example, an image input through an image scanner or the like and unprocessed, does not simultaneously satisfy the conditions of having high contrast and having the number of gradations equal to 2 even if it has a sharp edge portion, as long as it is not an artificial image. Even if such an edge exists in a natural image, resolution conversion for preventing occurrence of jags is required, since there is a dependence of the edge upon the resolution of the original information, as mentioned above.

When the number of gradations of peripheral pixels is 1, the contrast value is zero. If it is determined that the number of gradations is 1, or that the number of gradations is 2 while the contrast is high, then connection to terminal A is established in each of switches 105 and 109 to remove a dependence upon resolution by smoothing in the manner described above with respect to the first embodiment. After interpolation, maximum and minimum values are set. In this manner, resolution conversion is suitably executed.

(Third Embodiment)

Figure 9:
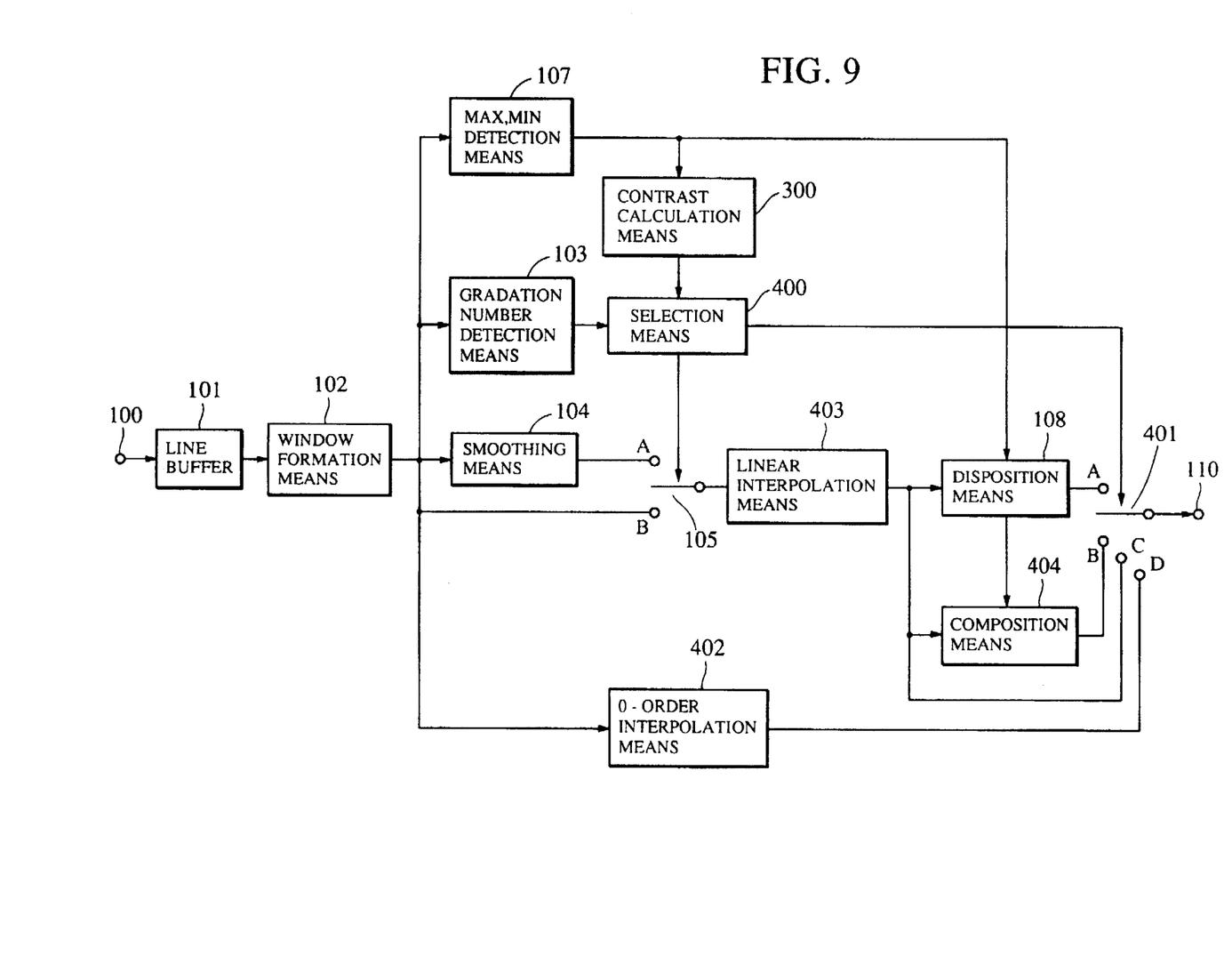
FIG. 9 is a block diagram showing essential components of a third embodiment of the present invention.

FIG. 9 shows blocks representing essential components of the third embodiment of the present invention. In FIG. 9, the components identical to those in FIGS. 1 and 8 are indicated by the same reference characters. In this embodiment, the number of cases sorted by a selection means 400 is increased in comparison with the second embodiment. The apparatus of this embodiment can be effectively applied to a printer or the like designed to output image at a higher resolution.

The selection means 400 is supplied with the number of gradations of peripheral pixels and the contrast value, as in the case of the second embodiment. In this embodiment, however, the attributes of the target pixel are divided into five categories. The selection means 400 controls the connections of switches 105 and 401 in accordance with changeover conditions shown in Table 1.

TABLE 1

| | | Switch | |
|---|---|---|---|
| No. | Condition | Switch 105 | Switch 401 |
| 1 | Number of gradations is 1. | — | D |
| 2 | Number of gradations is 2 and contrast is high. | A | A |
| 3 | Number of gradation is 2 and contrast is low. | — | D |
| 4 | Number of gradations is 3 or more and contrast is high. | B | B |
| 5 | Number of gradations is 3 or more and contrast is small. | B | C |

"—" indicates that there is no dependence.

A case where the number of gradations is 1 is assumed as a category No. 1. If the number of gradations is 1, any cases of artificial images, such as a character, a line drawing, and a part of a natural image, may be supposed. In this case, since the peripheral pixels have only one gradation, setting the pixel value of the target pixel is repeated for (N×M) pixels by a 0-order interpolation means 402.

A case where the number of gradations is 2 and where the contrast is high is assumed as a category No. 2. In this case, it is determined that the examined image portion is a portion of an artificial image, as described above.

The connection to the terminal A is established in both of switches 105 and 401 to limit the number of gradations in the target pixel block to 2 or less.

A case where the number of gradations is 2 and where the contrast is low is assumed as a category No. 3. In this case, both artificial and natural images are possible as in the case of the category No. 1. Since the contrast is low, no noticeable deterioration in image quality is caused by any kind of processing. In this embodiment, however, the 0-order interpolation means 401 is operated to obtain an output image.

A case where the number of gradations is 3 or more and where the contrast is high is assumed as a category No. 4.

In this case, a portion of a natural image including an edge may be supposed. Therefore, processed data from a linear interpolation means 403 is supplied to a composition means 404 as well as to the disposition means 108 without being directly output. The composition means 404 composes the target pixel block at a certain distribution ratio after the number of gradations in the linearly interpolated target pixel block has been adjusted to 2 by the disposition means 108. The distribution ratio may be previously determined experimentally or may be dynamically changed according to the contrast. The image from the disposition means is an image in which the sharpness of the edge is increased. It is combined with linear interpolation information to smooth the edge in the direction of gradation. In this manner, resolution conversion can be achieved while limiting interpolation blur.

A case where the number of gradations is 3 or more and where the contrast is low is assumed as a category No. 5. In this case, a flat portion of a natural image is supposed, and information on the pixels in the target pixel block is prepared by the ordinary linear interpolation means.

Processing with respect to the various categories has been described. However, the operation of this embodiment is not limited to the foregoing, and the menu of categories is not limited to those described above.

Resolution conversion free from occurrence of jags is realized by using a smoothing means. The smoothing means may be such that its smoothing filter is suitably changed according to the state in each window.

An example of the disposition means realized by a binary encoding means such as that shown in FIG. 6 has been described. Alternatively, a different system may be arranged in which pixels in one target pixel block after interpolation are sorted to distribute maximum and minimum values. For example, in such a case, a method is effective in which if the target pixel value is M, a value a satisfying an equation:

$$M = a \cdot MAX + (1-a) \cdot MIN \ (0 \leq a \leq 1)$$

is obtained and the maximum value is distributed to (a×N×M) pixels in the order from a larger pixel value to a smaller pixel value while the minimum value is distributed to the other pixels.

According to the present invention, as described above, even in a case where characters, a line drawing and the like artificially formed and a natural image are mixed in one image, jag-free high-edge-sharpness conversion is made with respect to artificial image portions while another kind of conversion is made with respect to natural image portions to form a good image free from interpolation blurs.

The present invention enables low-resolution image information to be easily converted into high-resolution information. It is therefore possible to achieve a communication between apparatuses differing in resolution and to provide a printer of a copying machine capable of outputting a high-quality image by enlarging an original image at any magnification.

If a system for the resolution conversion processing of the present invention is arranged in a printer, the amount of information transmitted from a host computer can be reduced, thereby achieving a reduction in the transfer time as well as a reduction in the capacity of a memory in the printer.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   means for inputting image information;
   detection means for detecting a number of gradations used for a target pixel and for peripheral pixels around the target pixel input by said input means; and
   conversion means for converting information on the target pixel into information on a plurality of pixels,
   wherein said conversion means determines a number of gradations used at the time of conversion of information on the target pixel into information on a plurality of pixels according to the number of gradations detected by said detection means.

2. An image processing apparatus according to claim 1, wherein said conversion means sets a number of gradations used at the time of conversion of information on the target pixel into information on a plurality of pixels to 2 or less, if the number of gradations detected by said detection means is 2 or less.

3. An image processing apparatus according to claim 1, further comprising smoothing means for smoothing image information input by said input means, wherein said conversion means converts information converted by said smoothing means into information on a plurality of pixels when the number of gradations detected by said detection means is equal or smaller than a predetermined number.

4. An image processing apparatus according to claim 1, further comprising extraction means for extracting first and second values from image information on a target pixel and on peripheral pixels around the target pixel input by said input means; and
   means for substituting the first and second values in information on a plurality of converted pixels based on information supplied from said conversion means when the number of gradations detected by said detection means is equal to or smaller than a predetermined number.

5. An image processing apparatus comprising:
   means for inputting image information;
   detection means for detecting the number of gradations in an image; and
   conversion means for converting information on one target pixel into information on a plurality of pixels according to the number of gradations detected by said detection means,
   wherein said conversion means determines a number of gradations used at the time of conversion of information on the target pixel into information on a plurality of pixels according to the number of gradations detected by said detection means.

6. An image processing apparatus comprising:
   means for inputting image information;
   detection means for detecting a number of gradations and a contrast in an image from the input image information; and
   conversion means for converting information on one target pixel into information on a plurality of pixels according to the number of gradations and the contrast detected by said detection means,
   wherein said conversion means determines a number of gradations used at the time of conversion of information on the target pixel into information on a plurality of pixels according to the number of gradations and the contrast detected by said detection means.

7. An image processing apparatus according to claim 6, wherein said conversion means uses a certain number of gradations equal to or smaller than a predetermined number to convert information on one pixel into information on a plurality of pixels if the number of gradations detected by said detection means is small while the contrast is high.

8. An image processing apparatus which converts image information on one pixel into information on N×M pixels (where N and M are each an integer equal to or larger than 2) along with the resolution thereof, said image processing apparatus comprising:
   detection means for detecting a number of gradations used for peripheral pixels around a target pixel;
   calculation means for detecting a maximum value and a minimum value of the peripheral pixels around the target pixel and for calculating a contrast from the maximum and minimum values;
   determination means for determining a number of gradations in N×M pixels corresponding to the target pixel on the basis of the number of gradations detected by said detection means and the contrast calculated by said calculation means; and conversion means for converting image information on the target pixel into information on N×M pixels according to the number of gradations determined by said determination means.

9. An image processing apparatus according to claim 8, further comprising comparison means for comparing the calculated contrast with a preset threshold value, wherein said determination means sets the number of gradations in N×M pixels corresponding to the target pixel to 2 or less if the number of gradations detected by said detection means is 2 or less and if said comparison means determines that the contrast is high.

10. An image processing apparatus which converts image information on one pixel into information on N×M pixels (where N and M are each an integer equal to or larger than 2) along with the resolution thereof, said image processing apparatus comprising:

smoothing means for smoothing input low-resolution image information;

interpolation means for interpolating the information smoothed by said smoothing means;

detection means for detecting first and second values from peripheral pixels around a target pixel;

disposition means for disposing the first and second values in N×M pixels on the basis of interpolation information from said interpolation means.

gradation number detection means for detecting a number of gradations of peripheral pixels around a target pixel; and conversion means for converting image information on the target pixel into information on N×M pixels according to the number of gradations detected by said gradation number detection means.

11. An image processing apparatus according to claim 10, wherein said conversion means selects whether or not a smoothing process by said smoothing means is executed and selects whether or not disposition by said disposition means is executed.

12. An image processing method comprising:

an input step of inputting image information;

a detection step of detecting a number of gradations used for a target pixel and for peripheral pixels around the target pixel input in said input step; and a conversion step of converting information on the target pixel into information on a plurality of pixels, wherein, in said conversion step, a number of gradations used at the time of conversion of information on the target pixel into information on a plurality of pixels is determined according to the number of gradations detected in said detection step.

13. An image processing method according to claim 12, wherein, in said conversion step, the number of gradations used at the time of conversion of information on the target pixel into information on a plurality of pixels is set to 2 or less, if the number of gradations detected in said detection step is 2 or less.

14. An image processing method comprising:

an input step of inputting image information;

a detection step of detecting a number of gradations in an image; and a conversion step of converting information on one target pixel into information on a plurality of pixels according to the number of gradations detected in said detection steps wherein, in said conversion step, a number of gradations used at the time of conversion of information on the target pixel into information on a plurality of pixels is determined according to the number of gradations detected in said detection step.

15. An image processing method comprising:

an input step of inputting image information;

a detection step of detecting a number of gradations and a contrast in an image from the input image information; and a conversion step of converting information on one target pixel into information on a plurality of pixels according to the number of gradations and the contrast 5 detected in said detection steps wherein, in said conversion step, a number of gradations used at the time of conversation of information on the target pixel into information on a plurality of pixels is determined according to the number of gradations detected in said detection step.

16. An image processing method according to claim 15, wherein, in said conversion step, a certain number of gradations equal to or smaller than a predetermined number is used to convert information on one pixel into information on a plurality of pixels if the number of gradations detected in said detection step is small while the contrast is high.

* * * * *

UNITED STATES PATENT AND TRADEMARK OFFICE
CERTIFICATE OF CORRECTION

PATENT NO. : 5,760,921
DATED : June 2, 1998
INVENTOR(S) : Nobutaka Miyake

It is certified that error appears in the above-identified patent and that said Letters Patent is hereby corrected as shown below:

COLUMN 1

Line 20, "image" should read --images--.

COLUMN 4

Line 51, "(FIG. 2(b)" should read --(FIG. 2(b))--.

COLUMN 5

Line 8, close up left margin; and
    Line 15, close up left margin.

COLUMN 6

Line 30, "surround" should read --surrounded--.

COLUMN 7

Line 65, "output" should read --output an--.

COLUMN 8

Line 14, "gradation" should read --gradations--;
    Line 30, close up right margin;
    Line 31, close up left margin; and
    Line 43, close up left margin.

COLUMN 11

Line 29, "means." should read --means;--.

UNITED STATES PATENT AND TRADEMARK OFFICE
CERTIFICATE OF CORRECTION

PATENT NO. : 5,760,921
DATED : June 2, 1998
INVENTOR(S) : Nobutaka Miyake

It is certified that error appears in the above-identified patent and that said Letters Patent is hereby corrected as shown below:

<u>COLUMN 12</u>

Line 20, "steps" should read --step,--;
    Line 34, "5" should be deleted;
    Line 35, "steps" should read --step,--; and
    Line 37, "conversation" should read --conversion--.

Signed and Sealed this

Twenty-third Day of March, 1999

Attest:

Q. TODD DICKINSON

Attesting Officer     Acting Commissioner of Patents and Trademarks